United States Patent [19]

Tillotson

[11] Patent Number: 4,915,999
[45] Date of Patent: Apr. 10, 1990

[54] CARPET PRODUCT WITH INTEGRAL BALANCING LAYER

[76] Inventor: John G. Tillotson, 1311 Dana Dr., Dalton, Ga. 30720

[21] Appl. No.: 306,940

[22] Filed: Feb. 6, 1989

[51] Int. Cl.[4] .......................... B32B 3/02; B32B 33/00
[52] U.S. Cl. ......................................... 428/95; 428/97
[58] Field of Search ..................................... 428/95, 97

[56] References Cited

U.S. PATENT DOCUMENTS

| | | | |
|---|---|---|---|
| 4,010,301 | 3/1977 | Anderson et al. | 428/95 |
| 4,010,302 | 3/1977 | Anderson et al. | 428/95 |
| 4,286,003 | 8/1981 | Higgins | 428/95 |
| 4,522,857 | 6/1985 | Higgins | 428/95 |

Primary Examiner—Marion C. McCamish
Attorney, Agent, or Firm—Jones, Askew & Lunsford

[57] ABSTRACT

An improved carpet product includes a pile fabric layer and a stabilizing layer adhered to the back of the pile fabric layer to provide dimensional stability against concentrated stresses exerted against the upper surface of the carpet. A balancing layer disposed below the stabilizing layer has thermal response and moisture absorption characteristics selected for compatibility with the pile fabric layer. When the carpet product is exposed to temperature extremes or changes in ambient humidity, stresses exerted by the expansion or contraction of the pile fabric layer create a bending moment around the stabilizing layer. However, the balancing layer creates comparable stresses on the lower side of the stabilizing layer and exerts an equal-but-opposite bending moment which balances the moment exerted by the pile fabric layer. The resulting carpet product exhibits enhanced flatness and floor hugging characteristics when subjected to temperature extremes or changes in the ambient humidity.

16 Claims, 1 Drawing Sheet

CARPET PRODUCT WITH INTEGRAL BALANCING LAYER

TECHNICAL FIELD

The present invention relates generally to carpet products, and relates more specifically to a composite carpet product exhibiting enhanced flatness and floor hugging characteristics when exposed to a wide variety of ambient conditions.

BACKGROUND OF THE INVENTION

Conventional carpet products are well known wherein a facing layer of pile yarns if affixed to a suitable backing fabric of polypropylene or the like. One of the most common problems associated with such carpet products concerns the ability of the carpet to lie flat on a floor surface under conditions of normal use. In addition to being subjected to concentrated stresses applied to the surface of the carpet, such as pedestrian traffic or an object being moved or wheeled across the carpet, a carpet may undergo changes in dimension resulting from variations in the environment. Such dimensional changes can result from exposure to thermal extremes, or by absorption or loss of moisture resulting from fluctuations in humidity. These changes in dimension may cause the carpet to wrinkle or buckle when it swells or expands, or may cause carpet seams to separate when contraction or shrinkage occurs.

In an effort to stabilize carpet products against concentrated stresses and against variations in the environment, it is known to incorporate into the carpet an additional fibrous layer that is resistant to stresses and is minimally affected by temperature and humidity changes. Woven or nonwoven fiberglass fabrics are notably useful for this purpose and effectively inhibit deformation of the carpet under stress, as well as dimensional changes in the carpet caused by environmental changes.

When glass fibers are used in a carpet, due to their inherent brittleness, they must be protected from breakage and prevented from migrating into the carpet pile. Otherwise, severe irritation to the user may result. To this end, it is known to encapsulate the fiberglass layer and adhere it to the carpet by means of a solid or cellular resilient backing material. Thus, a dimensionally stable carpet may be made from a layer of pile yarns positioned and supported by a suitable backing fabric, with the pile and backing fabric adhered to an underlying layer of encapsulated glass fibers.

Prior efforts have been made to overcome the deformation of carpets and carpet products resulting from concentrated stresses applied to the carpet's upper surface. Examples are found in U.S. Pat. No. 4,010,301 and its related U.S. Pat. No. 4,010,302, both of which disclose carpet products comprising a pile yarn facing layer adhered to an upper fiberglass stiffening and stabilizing layer. A layer of resilient thermoplastic material is disposed beneath the upper stiffening and stabilizing layer, and a second lower stiffening and stabilizing fiberglass layer is disposed beneath the thermoplastic layer. By controlling the thickness of the thermoplastic layer between the two fiberglass stiffening and stabilizing layers, the bend axis of the composite carpet tile is located closer to the upper stiffening and stabilizing layer than to the lower stiffening and stabilizing layer. Due to this larger moment arm below the bend axis of the carpet, the application of a lateral force to the top surface of the carpet, imparts to the carpet a greater tendency to bend downward than to bend upward. This improves the free-lay nature of the carpet, since the tendency of the carpet to hug the floor overrides the tendency of the carpet to turn upward under concentrated loads.

While the carpet products of the aforementioned U.S. Pat. Nos. 4,010,301 and 4,010,302 achieve some degree of success in resisting concentrated stresses exerted upon the surface of the carpet, they fail to address the problems caused by stresses created within the carpet resulting from exposure to temperature extremes or to changes in humidity. One such problem, commonly encountered during the manufacturing process, concerns the tendency of the polypropylene fabric commonly used as a primary backing layer to anneal when exposed to temperatures higher than 175° F. Exposure to such high temperatures can cause permanent shrinkage of the polypropylene. In contrast, the fiberglass layer is virtually impervious to the temperatures encountered during the manufacturing process. Thus, the different layers of the carpet are affected differently by the high temperatures of the manufacturing process. This difference in the response of the various layers to temperature extremes causes stress in the backing fabric layer as it attempts to change dimensions but is restricted from doing so by the more stable fiberglass layer. This stress can be relieved only by a bending of the carpet similar to the bimetallic bending commonly seen in thermostats and the like. This bending can cause portions of the carpet to lift upwardly off the floor, as the carpet tends to assume a concave or "curled" orientation. Efforts to overcome this stress problem by pre-shrinking the polypropylene layer, annealing it prior to attaching it to the more stable fiberglass layer, have been largely unsuccessful due to wrinkles and distortions in the annealed polypropylene layer and the difficulty in handling and in attaching the distorted pre-shrunk layer to the fiberglass layer.

A further problem is found when a conventional carpet product is exposed to changes in the ambient humidity. The various materials commonly used in carpet construction exhibit a wide disparity in water absorption characteristics. For example, wool and cellulosics such as cotton, jute, ramie, and sisal are capable of absorbing up to 15% of their weight in moisture. Nylon can absorb 6-8% of its weight in moisture, while polypropylene absorbs less than 0.1% of its weight in moisture and fiberglass virtually none. Thus, the different materials comprising carpet react differently to changes in humidity, as the different components absorb varying amounts of moisture. The more moisture a material absorbs, the more the material will tend to expand; and conversely, the more moisture a material loses, the more it will tend to shrink.

These variations in the hydrophilicity of the different materials comprising the carpet cause stresses within the carpet as it is exposed to changes in the ambient humidity. As the pile yarns absorb moisture, they tend to expand. However, since the adhesive anchoring the pile yarns to the backing fabric fills the interstices between adjacent pile yarn loop backs, such absorption of moisture causes stress in the pile yarn and backing fabric as they attempt to expand but are restricted from doing so by the more stable fiberglass layer beneath. Conversely, loss of moisture from the pile yarns can also cause stress as the pile yarn and backing fabric layer attempt to shrink but are restricted from doing so by the fiberglass layer. These stresses can again be relieved only by a bending of the carpet: a convex bending or "doming" in the case of moisture absorption, and a concave bending or "curling" in the case of moisture loss. Again, the bending can cause portions of the carpet to lift up off the floor, causing the carpet to become unsightly and hazardous. Unlike the problems presented by temperature extremes, which typically occur only during the manufacturing process, the problems presented by variations in the ambient humidity can plague a carpet product even after installation.

SUMMARY OF THE INVENTION

As will be seen, the present invention overcomes these and other problems associated with the prior art carpets and carpet products. Stated generally, the present invention comprises an improved carpet product which exhibits enhanced flatness and floor hugging characteristics. The carpet demonstrates dimensional stability when subjected to concentrated stresses exerted upon its upper surface. Further, the product resists bending and wrinkling when exposed to the temperature extremes to which it is subjected during the manufacturing process. Finally, the carpet product resists the curling and doming to which a conventional carpet is susceptible when exposed to variations in the ambient humidity.

Stated somewhat more specifically, the present invention comprises a composite carpet product which offsets the forces created within the carpet from stresses caused by thermal expansion and contraction or by absorption or loss of moisture. The carpet product comprises a pile fabric layer and a stabilizing layer laminated to the lower side of the pile fabric layer to provide dimensional stability against concentrated forces applied to the carpet surface. To offset the stresses created within the pile fabric layer caused by temperature extremes or fluctuations in humidity, the carpet product further comprises a balancing layer laminated to the side of the stabilizing layer opposite the pile fabric layer. The composition of the balancing layer is such that the balancing layer has a thermal and humidity response similar to that of the pile fabric layer. Thus, the stresses caused within the carpet by thermal extremes and variations in humidity are offset by similar forces in the balancing layer resulting from the same environmental factors.

Stated more precisely, the carpet product of the present invention comprises a pile yarn face layer tufted or bonded to a woven primary backing fabric of polypropylene or the like to form a pile fabric layer. To provide dimensional stability, a secondary backing of nonwoven fiberglass fabric or other dimensionally stable material is adhered to the back of the pile fabric layer, such as with a resilient polyurethane adhesive. A balancing fabric layer is then adhered to the opposite side of the fiberglass layer. The balancing fabric layer is selected to have thermal contraction and water absorption characteristics similar to the pile fabric layer. Optionally, a suitable cellular or noncellular resilient backing material can be adhered to the exposed side of the balancing back to provide a cushioning layer.

As stresses in the pile yarn and primary backing fabric layer are created by exposure of the carpet to temperature extremes or to changes in humidity, causing a bending moment around the more stable fiberglass layer, the balancing layer is equally stressed, creating an equal-but-opposite bending moment about the fiberglass balancing layer which offsets the stresses in the pile fabric layer. The carpet thus exhibits superior flatness and floor hugging characteristics.

Thus, it is an object of the present invention to provide an improved carpet product.

It is a further object of the present invention to provide a carpet product which exhibits improved flatness and floor hugging characteristics.

It is a yet another object of the present invention to provide a carpet product which resists deformation when exposed to temperature extremes.

Another object of the present invention is to provide a carpet product which resists curling and doming when exposed to changes in the ambient humidity.

Other objects, features, and advantages of the present invention will become apparent upon reading the following specification when taken in conjunction with the drawings and the appended claims.

DETAILED DESCRIPTION OF THE DISCLOSED EMBODIMENT

Figure 1:
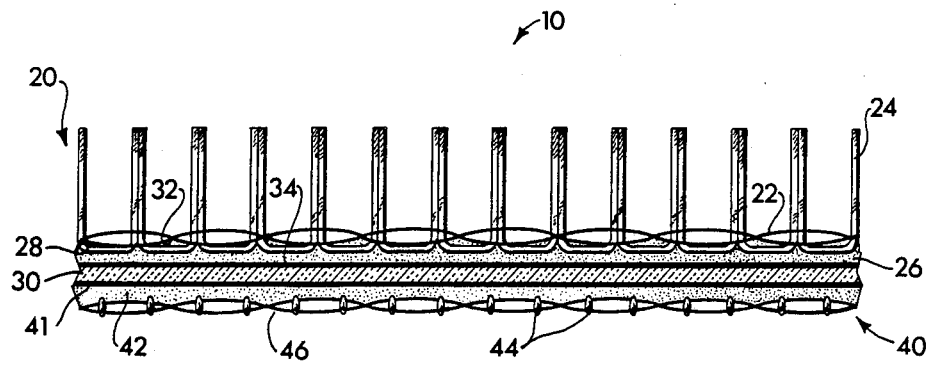
FIG. 1 shows a cross-sectional view of a first embodiment of an improved carpet product according to the present invention.

Referring now in more detail to the drawing, FIG. 1, the figure shows an improved carpet product 10 according to the present invention. The carpet product 10 includes a pile fabric layer 20 comprising a woven primary fabric backing 22 and a layer of pile yarns 24 tufted into the woven fabric backing. The primary backing fabric 22 of the disclosed embodiment is woven from polypropylene, though jute or other appropriate material may be used. The pile yarns 24 may be formed from nylon, wool, or other appropriate carpet pile yarn material. The pile yarns 24 are anchored to the primary backing fabric 22 in the disclosed embodiment by a polyurethane adhesive layer 26 applied onto the back of the primary backing fabric so as to encapsulate the loop backs 28 of the pile yarns.

To provide dimensional stability to the carpet product 10, a stabilizing layer 30 of nonwoven fiberglass fabric is adhered to the back face 32 of the pile fabric layer 20. The upper face 34 of the stabilizing layer 30 is advantageously adhered to the back face 32 of the pile fabric layer 20 with the same layer 26 of resilient polyurethane adhesive used to anchor the pile yarns 24 to the primary backing fabric 22. Methods for coating the back of the tufted fabric layer 20 with polyurethane adhesive and bringing it into intimate contact with the fiberglass stabilizing layer 30 are well within the ordinary level of skill in the art. One such method is shown in my U.S. Pat. No. 4,632,850, which patent is incorporated herein by reference.

The carpet product 10 further comprises a balancing fabric layer 40 adhered to the back 41 of the fiberglass stabilizing layer 30 with a resilient polyurethane adhesive 42. The balancing fabric layer 40 comprises a composite of nylon fibers 44 and woven polypropylene fabric 46. The nature and proportions of the materials comprising the balancing layer 40 are selected to provide thermal and moisture absorbancy characteristics compatible with those of the pile fabric layer 20. As the carpet product 10 is exposed to thermal extremes, such as are experienced during the manufacturing process, the polypropylene backing fabric 22 and pile yarns 24 tend to expand. Polypropylene, in particular, is subject to annealing when exposed to temperatures above 175° F., which can cause permanent shrinkage of the backing fabric 22. The fiberglass stabilizing layer 30, in contrast, is virtually impervious to heat. Thus, as the backing fabric 22 anneals and contracts, it causes a tension across the upper surface of the fiberglass stabilizing layer which exerts a bending moment about the stabilizing layer. This stress can be relieved only by a concave bending of the carpet.

Similarly, while the polypropylene and fiberglass layers 22, 30 are essentially hydrophobic and therefore unaffected by changes in humidity, tuft yarns comprised of hydrophilic fibers such as nylon and most natural fibers will tend to absorb moisture as humidity increases and to give up moisture as humidity decreases. As the pile yarns 24 absorb moisture, they enlarge. Since the interstices between adjacent loop backs 28 of the pile yarns 24 are filled with the polyurethane adhesive 26 securing the yarns to the primary fabric backing 22, the entire pile fabric layer 20 tends to enlarge. This expansion causes a bending moment about the fiberglass stabilizing layer 30 which can be relieved only by a convex buckling or wrinkling of the carpet.

Conversely, if the ambient humidity decreases, the pile yarns 24 will tend to give up moisture, which causes the pile yarns to contract and causes the pile fabric layer 20 to shrink. Such shrinkage can create a bending moment about the fiberglass stabilizing layer 30 which tends to cause a concave bending of the carpet.

To counteract these internal stresses, the balancing layer 40 is selected to provide thermal and moisture absorbancy characteristics which will create a bending moment about the fiberglass stabilizing layer 30 to counteract the bending moment exerted by the pile fabric layer 20 as the carpet is exposed to temperature extremes or to changes in humidity. To counteract stresses resulting from temperature extremes, the balancing layer 40 of the disclosed embodiment comprises the layer 46 of woven polypropylene fabric. As the composite carpet product is heated and the primary fabric backing 22 deforms, the polypropylene fabric layer 46 of the balancing layer 40 similarly deforms. Thus, as the primary fabric backing 22 exerts a tension on the front side 34 of the fiberglass stabilizing layer 30, the balancing layer 40 exerts an equal tension on the opposite side 41 of the stabilizing layer. The bending moment exerted by the deformation of the primary fabric backing layer 22 is thus counterbalanced by the equal-but-opposite bending moment exerted by the deformation of the balancing layer 40.

While the polypropylene fabric 46 of the balancing layer 40 will effectively offset stresses exerted by the thermal expansion and contraction of the polypropylene backing fabric 22 of the pile fabric layer 20, further provision must be made to balance the stresses created by changes in humidity. Since the polypropylene comprising the primary fabric backing 22 is essentially hydrophobic, substantially all of the absorption of moisture by the pile fabric layer 20 occurs in the pile yarns 24. To provide the balancing layer 40 with similar moisture absorption characteristics, the balancing layer includes a quantity of hydrophilic fibers 44 punched into the polypropylene fabric 46. The quantity of fibers 44 required to balance the moisture absorption characteristics of the pile yarns 24 is a factor of the absorbancy of the pile yarns relative to the absorbancy of the balancing fibers. For example, wool and cellulosic fibers, such as cotton, jute, ramie, and sisal, absorb up to 15% of their weight in water, while nylon absorbs approximately 6-8% of its weight in water. Thus, it would take approximately twice the amount of nylon fibers, by weight, to absorb the same amount of moisture as a given quantity of wool fibers. On the other hand, the portion of the pile yarns which projects upwardly out of the primary backing fabric 22 can expand or contract without exerting stresses in the pile fabric layer 20, since there is ample room between yarns to accommodate such expansion. Only the portions of the pile yarns 24 comprising the loop backs 28 will exert a stress within the tufted fabric layer 20 as they expand, since the interstices between adjacent loop backs are occupied by the polyurethane adhesive 26 anchoring the pile yarns to the backing fabric 22.

To provide a balancing layer which will approximate the moisture absorption characteristics of the pile fabric layer 20, a plurality of nylon fibers 44 are punched into the polypropylene fabric 46 of the balancing layer 40 sufficient to absorb the amount of moisture which the loop backs 28 are capable of absorbing. The quantity of such fibers 44 is calculated based upon the quantity of fibers needed to afford a moisture absorption capability to the balancing layer 40 proportional to that afforded the tufted fabric layer 20 by the loop backs 28. For example, if it is assumed that approximately 15% of each pile yarn 24 is below the surface of the primary backing fabric 22, and since nylon absorbs only half as much of its weight in moisture as does wool, then to balance a tufted fabric layer 20 comprising wool pile yarns, an amount of nylon fibers equal to twice the weight of the loop backs, or to 30% of the total weight of the pile yarns, will be required.

While nylon is presently the most cost effective fiber to incorporate into the balancing layer, it will be understood that other materials can be used, so long as the amount of fiber is controlled to provide an absorption characteristic to the balancing layer which is proportionate to the absorption characteristics of the tufted fabric layer 20.

As will be appreciated by those skilled in the art, the primary fabric backing 22 is not in direct contact with the fiberglass stabilizing layer 30 but rather is spaced apart therefrom by the thickness of the polyurethane layer 26 anchoring the loop backs 28 to the backing fabric. Since the magnitude of a bending moment about the stabilizing layer 30 is dependent not only upon the magnitude of the force but also upon the distance of the force from the stabilizing layer, the selection of a balancing layer 40 must take into account not only the magnitude of the stresses exerted within the tufted fabric layer 20 but also the distance of the tufted fabric layer from the stabilizing layer. The easiest way to take this factor into account is to eliminate it as a variable by spacing the balancing layer 40 the same distance below the stabilizing layer 30 as the tufted fabric layer 20 is above the stabilizing layer. However, it will be understood that other approaches can be used which control the distance between the balancing layer and the stabilizing layer as a function of the forces exerted by the tufted fabric layer and the balancing layer. For example, a carpet product might be constructed wherein the balancing layer is spaced apart from the stabilizing layer by a distance which is twice as great as the spacing between the stabilizing layer and the tufted fabric layer. Thus, the balancing layer need exert only half as much force as the tufted fabric layer to afford an equal bending moment, since the force is acting across twice as great a distance. This controlling of the spaced-apart relationships between the various layers could permit a balancing layer of, for example, a thinner polypropylene fabric with fewer nylon fibers punched therethrough, in exchange for a larger spacing between the balancing layer and the stabilizing layer.

Figure 2:
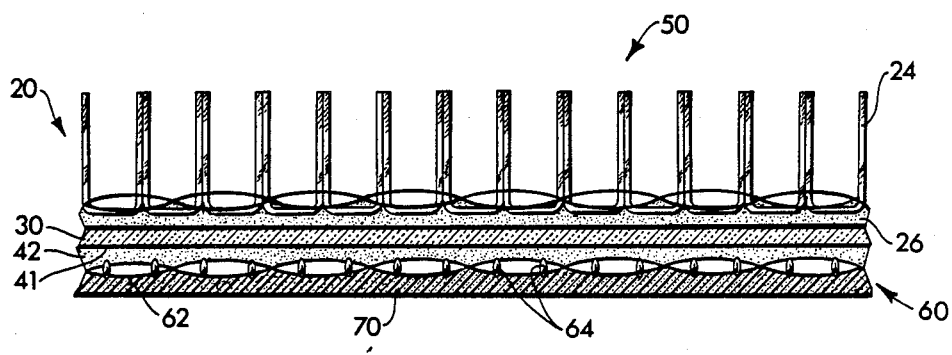
FIG. 2 shows a cross-sectional view of a second embodiment of an improved carpet product according to the present invention.

FIG. 2 depicts an alternate embodiment of a carpet product 50, which includes a tufted fabric layer 20 comprising a primary fabric backing layer 22 and a layer of pile yarns 24 tufted into the primary fabric backing layer. A layer 26 of polyurethane adhesive anchors the pile yarns 24 to the primary fabric backing layer 22. A stabilizing layer 30 of nonwoven fiberglass of other dimensionally stable material is affixed to the back of the tufted fabric layer 20. A second layer 42 of polyurethane adhesive anchors a balancing layer 60 to the back of the stabilizing layer 30. The balancing layer 60 includes a layer of polypropylene fabric 62 having a plurality of nylon fibers 64 punched therein.

To impart additional comfort and luxury to the carpet product 50, a cellular cushioning layer 70 is affixed to the back of the balancing layer 60. The cushioning layer 70 of the disclosed embodiment comprises polyurethane foamed in place on the back of the polypropylene fabric 62 of the balancing layer 40. However, it will be appreciated that other conventional means of providing an attached cushioning layer may be used, such as forming a flexible cellular sheet as a separate component and adhering the sheet to the back of the balancing layer. Methods of forming the cushioning layer as a separate component and adhering the cushioning layer to the back of the carpet are well known, one such method being disclosed in U.S. Pat. No. 4,522,857.

The inclusion of the integral cushioning layer 70 introduces an additional variable which must be taken into account when selecting the balancing layer 60. The cushioning layer 70 will have its own temperature response and moisture absorption characteristics which will exert a stress on the lower side of the stabilizing layer 30. Also, the cushioning layer 70 will normally be spaced apart from the stabilizing layer 30 by a distance which is greater than the distance by which the pile fabric layer 20 is spaced from the stabilizing layer, owing to the imposition of the balancing layer 60 between the stabilizing layer and the cushioning layer. Thus, the bending moment exerted by the cushioning layer 70 about the stabilizing layer 30 for a given force is proportionately greater because of the greater distance of the cushioning layer from the stabilizing layer. The bending moment exerted by the cushioning layer 70 about the stabilizing layer 30 must be taken into account in selecting the composition of the balancing layer 60. The bending moment exerted by the balancing layer 60 must be reduced accordingly so that the sum of the bending moments exerted by the cushioning layer 70 and the balancing layer about the stabilizing layer 30 will substantially equal the bending moment exerted by the pile fabric layer 20.

While the carpet product of the present invention is disclosed with respect to a pile fabric layer 20 wherein the pile yarns 24 are tufted to the primary fabric backing 22, it will be appreciated that the provision of an integral balancing layer is equally suited to other carpet products wherein the pile fabric layer is formed by bonding, knitting, or weaving. Also, it will be understood that the carpet construction of the present invention is equally suitable to carpets, rugs, and carpet tiles.

The foregoing embodiments have been disclosed with respect to carpet products which resist deformation in response both to thermal extremes and to variations in humidity. However, it will be understood that the present invention also contemplates a carpet with a balancing layer which addresses the thermal deformation problem without addressing the humidity response, as well as a carpet product with a balancing layer which addresses the humidity response problem without addressing the thermal deformation problem. Thus, while it may be highly desirable to provide a carpet product which resists deformation both in response to thermal extremes and in response to variations in humidity, the invention is by no means limited to a balancing layer which addresses both problems concurrently.

Finally, it will be understood that the preferred embodiment of the present invention has been disclosed by way of example, and that other modifications may occur to those skilled in the art without departing from the scope and spirit of the appended claims.

What is claimed is:

1. A carpet product comprising:
   a pile fabric layer having an upper face side and a lower back side;
   a stabilizing layer having upper and lower sides, said upper side of said stabilizing layer being superposed on the back side of said pile fabric layer and adhered thereto to provide dimensional stability against stresses applied against the face of said pile fabric layer; and
   a balancing layer having an upper side, said balancing layer being superposed on said lower said of said stabilizing layer and adhered thereto, and said balancing layer having thermal response and water absorption characteristics similar to the thermal response and water absorption characteristics of said pile fabric layer,
   whereby bending forces exerted by said pile fabric layer experiencing dimensional changes resulting from thermal changes or water absorption are counteracted by substantially equal bending forces exerted by said balancing layer experiencing similar dimensional changes resulting from said thermal changes or water absorption,
   whereby said carpet product resists bending in response to temperature extremes and variations in ambient humidity.

2. The carpet product of claim 1, wherein said pile fabric layer comprises a woven polypropylene fabric backing having a plurality of face yarns tufted thereto, and wherein said balancing layer comprises a woven polypropylene fabric having a plurality of fibers having a hydrophilicity similar to the hydrophilicity of said face yarns punched therethrough such that the thermal contraction and water absorption characteristics of said balancing layer are similar to the thermal contraction and water absorption characteristics of said pile fabric layer.

3. The carpet product of claim 1, wherein said stabilizing layer comprises a nonwoven fiberglass layer.

4. A carpet product comprising:
   a pile fabric layer having an upper face side and a lower back side;
   a stabilizing layer having upper and lower sides, said upper side of said stabilizing layer being superposed on the back side of said pile fabric layer and adhered thereto to provide dimensional stability against stresses applied against the face of said pile fabric layer; and a balancing layer having an upper side, said balancing layer being superposed on said lower side of said stabilizing layer and adhered thereto, and said balancing layer having thermal response characteristics similar to the thermal response characteristics of said pile fabric layer, whereby bending forces exerted by said pile fabric layer experiencing dimensional changes resulting from thermal changes are counteracted by substantially equal bending forces exerted by said balancing layer experiencing similar dimensional changes resulting from said thermal changes, whereby said carpet product resists bending in response to temperature extremes.

5. The carpet product of claim 4, wherein said pile fabric layer comprises a woven polypropylene fabric backing having a plurality of face yarns tufted thereto, and wherein said balancing layer comprises a woven polypropylene fabric having thermal response characteristics similar to the thermal response characteristics of said pile fabric layer.

6. The carpet product of claim 4, wherein said stabilizing layer comprises a nonwoven fiberglass layer.

7. A carpet product comprising:
a pile fabric layer having an upper face side and a lower back side;
a stabilizing layer having upper and lower sides, said upper side of said stabilizing layer being superposed on the back side of said pile fabric layer and adhered thereto to provide dimensional stability against stresses applied against the face of said pile fabric layer; and
a balancing layer having an upper side, said balancing layer being superposed on said lower side of said stabilizing layer and adhered thereto, and said balancing layer having water absorption characteristics similar to the water absorption characteristics of said pile fabric layer,
whereby bending forces exerted by said pile fabric layer experiencing dimensional changes resulting from water absorption are counteracted by substantially equal bending forces exerted by said balancing layer experiencing similar dimensional changes resulting from said water absorption,
whereby said carpet product resists bending in response to variations in ambient humidity.

8. The carpet product of claim 7, wherein said pile fabric layer comprises a woven polypropylene fabric backing having a plurality of face yarns tufted thereto, and wherein said balancing layer comprises a woven polypropylene fabric having a plurality of fibers having a hydrophilicity similar to the hydrophilicity of said face yarns punched therethrough such that the water absorption characteristics of said balancing layer are similar to the water absorption characteristics of said pile fabric layer.

9. The carpet product of claim 7, wherein said stabilizing layer comprises a nonwoven fiberglass layer.

10. A carpet product comprising:
a pile fabric layer having an upper face side and a lower back side;
a stabilizing layer having upper and lower sides, said upper side of said stabilizing layer being disposed in mutually facing relation to said back side of said pile fabric layer at a first distance therefrom and adhered thereto to provide dimensional stability against stresses applied against the face of said pile fabric layer; and a balancing layer having an upper side, said balancing layer being disposed in mutually facing relation to said lower side of said stabilizing layer at a second distance therefrom and adhered thereto, said balancing layer being selected to have thermal response and water absorption characteristics such that a moment about said stabilizing layer resulting from a force in said balancing layer resulting from thermal changes or water absorption acting through said second distance counteracts the moment about said stabilizing layer resulting from the force in said pile fabric layer resulting from said thermal changes or water absorption acting through said first distance, whereby the bending moment exerted by said pile fabric layer undergoing dimensional changes resulting from thermal changes or water absorption is counteracted by a substantially equal bending moment exerted by said balancing layer undergoing dimensional changes resulting from said thermal changes or water absorption, whereby said carpet product resists bending in response to temperature extremes and variations in ambient humidity.

11. A carpet product comprising:
a pile fabric layer having an upper face side and a lower back side;
a stabilizing layer having upper and lower sides, said upper side of said stabilizing layer being disposed in mutually facing relation to said back side of said pile fabric layer at a first distance therefrom and adhered thereto to provide dimensional stability against stresses applied against the face of said pile fabric layer; and
a balancing layer having an upper side, said balancing layer being disposed in mutually facing relation to said lower side of said stabilizing layer at a second distance therefrom and adhered thereto,
said balancing layer being selected to have thermal response characteristics such that a moment about said stabilizing layer resulting from a force in said balancing layer resulting from thermal changes acting through said second distance counteracts the moment about said stabilizing layer resulting from the force in said pile fabric layer resulting from said thermal changes acting through said first distance,
whereby the bending moment exerted by said pile fabric layer undergoing dimensional changes resulting from thermal changes is counteracted by a substantially equal bending moment exerted by said balancing layer undergoing dimensional changes resulting from said thermal changes,
whereby said carpet product resists bending in response to temperature extremes.

12. A carpet product comprising:
a pile fabric layer having an upper face side and a lower back side;
a stabilizing layer having upper and lower sides, said upper side of said stabilizing layer being disposed in mutually facing relation to said back side of said pile fabric layer at a first distance therefrom and adhered thereto to provide dimensional stability against stresses applied against the face of said pile fabric layer; and a balancing layer having an upper side, said balancing layer being disposed in mutually facing relation to said lower side of said stabilizing layer at a second distance therefrom and adhered thereto, said balancing layer being selected to have water absorption characteristics such that a moment about said stabilizing layer resulting from a force in said balancing layer resulting from water absorption acting through said second distance counteracts the moment about said stabilizing layer resulting from the force in said pile fabric layer resulting from said water absorption acting through said first distance, whereby the bending moment exerted by said pile fabric layer undergoing dimensional changes resulting from water absorption is counteracted by a substantially equal bending moment exerted by said balancing layer undergoing dimensional changes resulting from said water absorption, whereby said carpet product resists bending in response to variations in ambient humidity.

13. A carpet product comprising:
a pile fabric layer having an upper face side and a lower back side;
a stabilizing layer having upper and lower sides, said upper side of said stabilizing layer being disposed in mutually facing relation to said back side of said tufted fabric layer at a first distance therefrom and adhered thereto to provide dimensional stability against stresses applied against the face of said pile fabric layer;
a balancing layer having upper and lower sides, said upper side of said balancing layer being disposed in mutually facing relation to said lower side of said stabilizing layer at a second distance therefrom and adhered thereto; and
a cushioning layer having an upper side, said cushioning layer being disposed with its upper side in mutually facing relation to said lower side of said balancing layer at a third distance therefrom and adhered thereto,
said balancing layer being selected to have thermal response and water absorption characteristics such that the moment about said stabilizing layer resulting from the sum of a force in said balancing layer resulting from thermal changes or water absorption acting through said second distance plus a force in said cushioning layer resulting from said thermal changes or water absorption acting through said third distance counteracts the moment about said stabilizing layer resulting from the force in said pile fabric layer resulting from said thermal changes or water absorption acting through said first distance,
whereby bending forces exerted by said pile fabric layer resulting from thermal changes or water absorption are counteracted by substantially equal bending forces exerted by said balancing layer and said cushioning layer resulting from said thermal changes or water absorption,
whereby said carpet product resists bending in response to temperature extremes and variations in ambient humidity.

14. A carpet product comprising:
a pile fabric layer having an upper face side and a lower back side;
a stabilizing layer having upper and lower sides, said upper side of said stabilizing layer being disposed in mutually facing relation to said back side of said tufted fabric layer at a first distance therefrom and adhered thereto to provide dimensional stability against stresses applied against the face of said pile fabric layer;
a balancing layer having upper and lower sides, said upper side of said balancing layer being disposed in mutually facing relation to said lower side of said stabilizing layer at a second distance therefrom and adhered thereto; and
a cushioning layer having an upper side, said cushioning layer being disposed with its upper side in mutually facing relation to said lower side of said balancing layer at a third distance therefrom and adhered thereto,
said balancing layer being selected to have thermal response characteristics such that the moment about said stabilizing layer resulting from the sum of a force in said balancing layer resulting from thermal changes acting through said second distance plus a force in said cushioning layer resulting from said thermal changes acting through said third distance counteracts the moment about said stabilizing layer resulting from the force in said pile fabric layer resulting from said thermal changes acting through said first distance,
whereby bending forces exerted by said pile fabric layer resulting from thermal changes are counteracted by substantially equal bending forces exerted by said balancing layer and said cushioning layer resulting from said thermal changes,
whereby said carpet product resists bending in response to temperature extremes.

15. A carpet product comprising:
a pile fabric layer having an upper face side and a lower back side;
a stabilizing layer having upper and lower sides, said upper side of said stabilizing layer being disposed in mutually facing relation to said back side of said tufted fabric layer at a first distance therefrom and adhered thereto to provide dimensional stability against stresses applied against the face of said pile fabric layer;
a balancing layer having upper and lower sides, said upper side of said balancing layer being disposed in mutually facing relation to said lower side of said stabilizing layer at a second distance therefrom and adhered thereto; and
a cushioning layer having an upper side, said cushioning layer being disposed with its upper side in mutually facing relation to said lower side of said balancing layer at a third distance therefrom and adhered thereto,
said balancing layer being selected to have water absorption characteristics such that the moment about said stabilizing layer resulting from the sum of a force in said balancing layer resulting from water absorption acting through said second distance plus a force in said cushioning layer resulting from said water absorption acting through said third distance counteracts the moment about said stabilizing layer resulting from the force in said pile fabric layer resulting from said water absorption acting through said first distance,
whereby bending forces exerted by said pile fabric layer resulting from water absorption are counteracted by substantially equal bending forces exerted by said balancing layer and said cushioning layer resulting from said water absorption, whereby said carpet product resists bending in response to variations in ambient humidity.

16. A carpet product comprising:

a core layer having opposing sides and being comprised of a fibrous material having a low coefficient of thermal expansion and low water absorption characteristics;

a pile fabric layer adhered to one side of said core layer and having a greater coefficient of thermal expansion and greater water absorption characteristics than those of said core layer; and a balancing layer adhered to the side of said core layer opposite said pile fabric layer and selected to have a coefficient of thermal expansion and water absorption characteristics substantially equal to those of said pile fabric layer.

* * * * *